United States Patent [19]
Sampath et al.

[11] Patent Number: 5,744,782
[45] Date of Patent: Apr. 28, 1998

[54] ADVANCED CONSUMABLE ELECTRODES FOR GAS METAL ARC (GMA) WELDING OF HIGH STRENGTH LOW ALLOY (HSLA) STEELS

[75] Inventors: Krishnaswamy Sampath, Johnstown, Pa.; Richard Samuel Green, Westerville, Ohio

[73] Assignee: Concurrent Technologies Corporation, Johnstown, Pa.

[21] Appl. No.: 610,586

[22] Filed: Mar. 7, 1996

[51] Int. Cl.$^6$ .................................................. B23K 35/22
[52] U.S. Cl. ........................... 219/146.1; 219/137 WM
[58] Field of Search ......................... 219/146.23, 146.1, 219/137 WM, 146.24

[56] References Cited

U.S. PATENT DOCUMENTS

| | | | |
|---|---|---|---|
| 2,810,818 | 10/1957 | Rothschild et al. | 219/137 |
| 3,097,294 | 7/1963 | Kubli et al. | 219/145 |
| 3,162,751 | 12/1964 | Robbins | 219/137 |
| 3,368,887 | 2/1968 | Enis et al. | 219/146.23 |
| 3,377,461 | 4/1968 | Ballass et al. | 219/146.23 |
| 3,394,238 | 7/1968 | Wilcox | 219/146.23 |
| 3,404,249 | 10/1968 | Dorschu | 219/74 |
| 3,602,689 | 8/1971 | Heuschkel | 219/137 |
| 3,700,851 | 10/1972 | Björkroth | 219/137 |
| 3,802,874 | 4/1974 | Nelson et al. | 420/120 |
| 3,860,777 | 1/1975 | Sawhill, Jr. | 219/61 |
| 4,068,113 | 1/1978 | Godai et al. | 219/146.23 |
| 4,412,122 | 10/1983 | Böhm et al. | 219/137 |
| 4,994,647 | 2/1991 | Tanaka et al. | 219/146.23 |
| 5,095,191 | 3/1992 | Bushey et al. | 219/137 |
| 5,227,609 | 7/1993 | Simon et al. | 219/137 |
| 5,272,315 | 12/1993 | Guth | 219/137 |
| 5,300,751 | 4/1994 | Endo et al. | 219/61 |

FOREIGN PATENT DOCUMENTS 446377  10/1974  U.S.S.R. .

OTHER PUBLICATIONS

Irving, "U.S. Navy Maintains High Interest in Funding for Welding Research," Welding Journal, pp. 42–45, Mar. 1995.

Wong, et al., "Arc Welding Consumables for HSLA Steels with yield Strength of 80 ksi and Above," Proceedings: International Conference on the Metallurgy, Welding and Qualification of Microalloyed (HSLA) Steel Weldments, pp. 450–489c, Nov. 6–8, 1990.

MIL–E–23765/2E(SH), Military Specification: Electrodes and Rods—Welding, Bare, Solid, or Alloy Cored; and Fluxes, Low Alloy Steel, Apr. 22, 1994.

Yurioka, et al., "Determination of Necessary Preheating Temperature in Steel Welding," Welding Research Supplement—Supplement to the Welding Journal, pp. 147s–153s, Jun. 1983.

*Primary Examiner*—Clifford C. Shaw
*Attorney, Agent, or Firm*—Mark J. Young; Steven L. Schmid

[57] ABSTRACT

This invention relates to solid, bare, consumable wire electrodes for gas metal arc (GMA) welding of high strength low alloy (HSLA) steels. The electrodes require little or no preheat, interpass and post soak temperature controls. The invention also relates to the method of welding and weld deposits produced therefrom.

23 Claims, No Drawings

ADVANCED CONSUMABLE ELECTRODES FOR GAS METAL ARC (GMA) WELDING OF HIGH STRENGTH LOW ALLOY (HSLA) STEELS

GOVERNMENT RIGHTS

The U.S. Government has a paid-up license in this invention and the right in limited circumstances to require the patent owner to license others on reasonable terms as provided for by the terms of Contract No. N00140-92-C-BC49 awarded by the U.S. Navy.

BACKGROUND

This invention relates to consumable welding electrodes and is particularly directed to consumable, bare, solid-wire electrodes for gas metal arc (GMA) welding of high-strength low-alloy (HSLA) steels; the method of welding such steels; and weld deposits produced therefrom.

Economical fabrication of Naval ship structures requires a new generation of solid wire electrodes for gas metal arc (GMA) welding of HSLA-80 and HSLA-100 steels. High yield (HY) and high-strength low-alloy (HSLA) type steels with a minimum yield strength of 80 or 100 ksi are used extensively in Naval ship construction. The HY steels were developed in the 1960's and exhibit a tempered martensitic microstructure. The HY-80 and HY-100 steels are characterized by a high carbon content ranging from about 0.12 to 0.20 wt. % (percent by weight). The high carbon content and martensitic microstructures of these steels require the application of preheat, interpass and occasionally post soak controls during welding to reduce the occurrence of hydrogen assisted cracking (HAC) in the weld heat affected zone (HAZ). These additional operations increase fabrication cost, produce considerable production delays and increase welder discomfort.

As specified in MIL-E-23675/2E(SH), *Military Specification: Electrodes and Rods— Welding, Bare, Solid, or Alloy Cored; and Fluxes, Low Alloy Steel*, the MIL-100S and MIL-120S welding consumables used for joining HY-80 and HY-100 steels also exhibit a relatively high carbon content, in excess of 0.05 wt. %. Consequently, these welding consumables also require significant preheat to reduce the occurrence of HAC in the weld metal. Preheating of weldments adds significantly to construction costs.

HSLA steels were developed in an effort to reduce fabrication costs. In contrast to the HY steels, the HSLA-80 and HSLA-100 steels have low carbon content (0.07 wt. % maximum) and exhibit a ferritic and bainitic microstructure, respectively. These microstructures exhibit little or no susceptibility to HAC. Because of their low susceptibility to HAC, HSLA-80 and HSLA-100 steels require much less stringent preheating controls compared to the corresponding HY steels.

However, HSLA-80 and HSLA-100 steels are currently fabricated with the MIL-100S and MIL-120S solid wire electrodes used for GMA welding of HY-80 and HY-100 steels. Since the currently available MIL-100S and MIL-120S solid wire electrodes require preheat and interpass controls, and post soak temperate control for MIL-120S, their use precludes the full economic advantages of HSLA steels. For the foregoing reasons, there is a need for consumable, bare, solid-wire electrodes for GMA welding of HSLA-80 and HSLA-100 steels, which can eliminate or reduce the need for preheat controls while meeting the mechanical property requirements of the existing MIL-100S and MIL-120S GMA welding consumable electrodes when welded over a broad range of weld energy inputs and cooling rates. Table I, below, shows mechanical property requirements for MIL-100S and MIL-120S electrodes.

TABLE I

MIL-E-23765/2E
Mechanical Property Requirements
For As-Welded GMA Welds

| MIL-type | Yield Strength (ksi) | Elongation† | Charpy V-notch Impact Toughness‡ at 0° F. | at −60° F. |
|---|---|---|---|---|
| MIL-100S | 82–100 | 16% | 60 ft-lbs | 35 ft-lbs |
| MIL-120S | 102–123 | 15% | 60 ft-lbs | 45 ft-lbs |

†Elongation in two (2) inches minimum gage length.
‡Minimum average. The average value of five tests must be equal to or greater than the minimum average specified. No two specimens can have values below the minimum average specified. One specimen can have a value of 10 ft-lbs below the minimum average specified.

SUMMARY

The present invention is directed to consumable, bare, solid-wire electrodes for GMA welding of HSLA-80 and HSLA-100 steels, which can eliminate or reduce the need for preheat controls while meeting the mechanical property requirements of the existing MIL-100S and MIL-120S GMA welding consumable electrodes when welded over a broad range of weld energy inputs and cooling rates. The invention is also directed to the method of welding and weld deposits produced therefrom.

A composition having the features of the present invention is comprised of iron, manganese, nickel, chromium, molybdenum, silicon, copper, vanadium, niobium, and boron. The amounts in percent by weight of carbon (C), manganese (Mn), nickel (Ni), chromium (Cr), molybdenum (Mo), silicon (Si), copper (Cu), vanadium (V), niobium (Nb), and boron (B) satisfy the following three equations:

$$B_{50}(°C.)=770-(270\times C)-(90\times Mn)-(37\times Ni)-(70\times Cr)-(83\times Mo) \quad 1)$$

where $B_{50}$ is about 400° C. to 500° C.;

$$M_s(°C.)=561-(474\times C)-(33\times Mn)-(17\times Ni)-(17\times Cr)-(21\times Mo) \quad 2)$$

where $M_S$ is about 400° C. to 450° C.;

$$CEN=C+A(C)\times[Si/24+Mn/6+Cu/15+Ni/20+(Cr+Mo+V+Nb)/5+5B]$$

where $A(C)=0.75+0.25 \tanh[20\times(C-0.12)]$; and
where CEN is about 0.28 to 0.41.

The first equation relates the chemical composition to the $B_{50}$ temperature, i.e., the temperature at which 50% bainite transformation occurs. Bainite refers to a crystalline structure of considerable toughness, combining high strength with high ductility. The second equation relates the chemical composition to the $M_S$ temperature, i.e., the temperature at which martensite transformation starts. Martensite refers to a very hard but brittle structure of iron and carbon. Desired ranges for $B_{50}$ and $M_S$ temperatures are approximately 400° C. to 500° C. and 400° C. to 450° C., respectively.

Low-carbon bainitic steels exhibit high tensile strength (135 to 170 ksi range) and good impact toughness at low temperature. The carbon content of these steels typically ranges from 0.08 wt. % up to 0.17 wt. %. Irvine, K. J. and Pickering, F. B., "Low-Carbon Bainitic Steels," *Journal of the Iron and Steel Institute*, 184 (12), pp. 292–309 (1957). These steels contain alloy additions which retard the transformation of austentite to high temperature (e.g., proeutectoid or blocky) ferrite, and facilitate the transformation to lower bainite. The alloy additions also suppress the martensite start ($M_S$) temperature. The $M_S$ temperature of these steels is often well below their corresponding $B_{50}$ temperature (the temperature at which 50% bainite transformation occurs). The bainite transformation goes to completion at approximately 60° C. below the $B_{50}$ temperature. Steven, W. and Haynes, A. G., "The Temperature of formation of Martensite and Bainite in Low-Alloy Steels," *Journal of the Iron and Steel Institute*, 183(8), pp. 349–359 (1956). The low-carbon bainitic steels exhibit a $B_{50}$ temperature in the range of 420° to 550° C. and their strength increases linearly with decrease in $B_{50}$ temperature. Leslie, W. C., *The Physical Metallurgy of Steels*, McGraw-Hill International Book Company, McGraw-Hill Kogakusha, Inc., Tokyo, Japan, pp. 201–205 (1981).

It was therefore discovered that welding electrodes designed to provide weld metal characterized by a $B_{50}$ temperature in the range of 400° to 500° C., and an $M_S$ temperature below the $B_{50}$ temperature, exhibit high strength and acceptable Charpy V-notch (CVN) impact toughness.

The preheat, interpass and post soak controls necessary to minimize the susceptibility of structural steels to HAC can also be related to the chemical composition of the steels. The CEN equation relates the carbon equivalent number (CEN) to chemical composition. In general, an increase in the CEN increases the need for higher levels of preheat. The CEN may be expressed as a function of the carbon (C), manganese (Mn), nickel (Ni), chromium (Cr), molybdenum (Mo), silicon (Si), copper (Cu), vanadium (V), niobium (Nb), and boron (B) content in weight percent. Thus, the CEN equation provides a means to assess the relative effects of different alloy elements on the need for preheat. Yurioka, N., Suzuki, H., Ohshita, S. and Saito, S., "Determination of Necessary Preheating Temperature in Steel Welding," *Welding Journal*, 62(6), pp. 147s–153s (1983).

The CEN equation was used to assess the relative effects of different alloy elements on the need for preheat. The carbon content has the greatest effect on the CEN and a substantial reduction in weld metal carbon content is necessary to obtain significant reduction in preheat levels. To further reduce the CEN and the sensitivity of weld metals to preheat controls, it is desirable to limit the levels of elements with the highest coefficients in the CEN equation (e.g., boron, chromium, molybdenum, vanadium, niobium) and increase the levels of elements with the lowest coefficients in the CEN equation (e.g., silicon, nickel, copper and manganese). Since copper and silicon contribute relatively little to strengthening, and excessive additions may promote fusion zone solidification cracking if the weld metal undergoes primary austenitic type solidification, it is preferable that a substantial reduction in carbon content is compensated with appropriate increases in nickel and manganese contents to achieve adequate strength and toughness without impairing the sensitivity to preheat.

Furthermore, oxides and nitrides generally decrease weld-metal ductility and sometimes strength, and may prevent fusion. Therefore, it is desirable to minimize combined oxygen and nitrogen content.

Thus, this metallurgical approach for formulating the chemical composition of solid wire electrodes for GMA welding of HSLA steels relates the strength and toughness properties of advanced filler wire systems with the following metallurgical criteria: $B_{50}$ temperature (the temperature at which 50% bainite transformation occurs), $M_S$ temperature (the temperature at which martensite transformation starts), and combined oxygen and nitrogen content. The approach also relates the need to eliminate or reduce preheat, interpass, and post soak temperature controls with the carbon equivalent number, CEN.

Another aspect of this invention is the method of arc welding using the advanced consumable electrodes and weld metals produced therefrom. The method of arc welding is the GMA welding process. The GMA welding process is an electric arc welding process which produces coalescence of metals by heating them with an electric arc established between a consumable metal electrode and a workpiece. A continuously-fed consumable electrode is guided through and maintains contact with a contact tube which also acts to transfer current to the electrode. Gas shielding with a principally inert gas atmosphere serves to exclude oxygen and nitrogen of the air from the arc and metal, thus reducing the formation of oxides and nitrides. In general, oxides and nitrides decrease weld-metal ductility and sometimes strength, and may prevent fusion.

These and other features, aspects, and advantages of the present invention will become better understood with reference to the following description and appended claims.

DESCRIPTION

The following metallurgical criteria for weld metal are used in formulating the chemical composition of solid wire electrodes to meet the strength and toughness requirements of MIL-100S and MIL-120S electrodes, as well as exhibit a reduced sensitivity to preheat:

(1) a CEN ranging from 0.28 to 0.41;

(2) a $B_{50}$ temperature ranging from about 400° C. to 500° C.;

(3) an $M_S$ temperature less than the corresponding $B_{50}$ temperature; and (4) a combined oxygen and nitrogen content preferably below 550 ppm.

The gas content is controlled initially through producing melts for wire electrodes using vacuum induction melting practices and subsequently through the application of suitable welding conditions, e.g., a principally inert gas atmosphere. The metallurgical criteria for weld metal chemistry are met through a judicious selection of the chemistry of solid wire electrodes.

For example, in selecting the weld metal chemistry, one could remove chromium and significantly reduce the carbon content in the wire electrode, and thereby reduce the CEN, and substantially minimize the need for preheat controls. These losses in alloy content could be compensated with appropriate increases in nickel and manganese content of the wire electrode to meet the $B_{50}$ and $M_S$ criteria, and thereby achieve adequate strength and toughness in the weld metal without impairing its sensitivity to preheat. In contrast, substituting molybdenum in the place of carbon is likely to provide only a minimal decrease in CEN, while substantial additions of molybdenum to reduce CEN may not allow one to meet the $B_{50}$ and $M_S$ criteria.

Ten compositions of solid wire electrodes were prepared. Eight of the ten compositions were based on a $2^3$ factorial design, with one low and another high level for manganese (approximately 1.5 wt. % and 1.8 wt. %), nickel (approximately 2.4 wt. % and 3.8 wt. %) and molybdenum (approximately 0.5 wt. % and 1.0 wt. %). One additional wire composition represented the mid-level for manganese (approximately 1.65 wt. %), nickel (approximately 3.1 wt. %) and molybdenum (approximately 0.75 wt. %). Another The weldments were produced in the flat position and with nominal restraint.

TABLE II

Chemical Composition of Solid Wire Electrodes

| Wire # | C | Mn | Si | Cr | Ni | Mo | Ti | Cu | B | V | S | P | N | O | H |
|---|---|---|---|---|---|---|---|---|---|---|---|---|---|---|---|
| 1 | 0.027 | 1.51 | 0.34 | 0.02 | 2.52 | 0.52 | 0.033 | 0.001 | 0.001 | 0.001 | 0.0019 | 0.001 | 6 | 69 | 2.11 |
| 2 | 0.028 | 1.49 | 0.37 | 0.01 | 2.38 | 0.99 | 0.031 | 0.001 | 0.001 | 0.001 | 0.0018 | 0.001 | 9 | 47 | 1.51 |
| 3 | 0.028 | 1.54 | 0.34 | 0.01 | 3.78 | 0.52 | 0.028 | 0.001 | 0.001 | 0.001 | 0.0018 | 0.001 | 10 | 52 | 2.13 |
| 4 | 0.029 | 1.50 | 0.35 | 0.01 | 3.73 | 0.98 | 0.030 | 0.001 | 0.001 | 0.002 | 0.0018 | 0.001 | 6 | 78 | 1.46 |
| 5 | 0.030 | 1.82 | 0.34 | 0.01 | 2.37 | 0.52 | 0.029 | 0.001 | 0.001 | 0.003 | 0.0020 | 0.001 | 6 | 76 | 1.63 |
| 6 | 0.029 | 1.82 | 0.35 | 0.01 | 2.38 | 0.98 | 0.029 | 0.001 | 0.001 | 0.003 | 0.0021 | 0.001 | 7 | 66 | 1.15 |
| 7 | 0.026 | 1.82 | 0.35 | 0.01 | 3.77 | 0.51 | 0.027 | 0.001 | 0.001 | 0.002 | 0.0022 | 0.001 | 6 | 64 | 1.79 |
| 8 | 0.030 | 1.80 | 0.33 | 0.01 | 3.72 | 0.99 | 0.025 | 0.001 | 0.0003 | 0.003 | 0.0019 | 0.001 | 4 | 82 | 1.23 |
| 9 | 0.028 | 1.66 | 0.33 | 0.01 | 3.04 | 0.76 | 0.025 | 0.001 | 0.001 | 0.002 | 0.0023 | 0.001 | 5 | 53 | 2.35 |
| 10 | 0.028 | 1.68 | 0.34 | 0.01 | 3.09 | 0.76 | 0.025 | 0.20 | 0.0057 | 0.003 | 0.0022 | 0.001 | 6 | 80 | 1.55 |

Chemical compositions determined from VIM ingots. Values expressed in wt %. The balance is essentially iron. N, O, and H values were determined from the solid wire electrodes; N and O contents expressed in ppm; H content expressed in mL/100 g; wire size 0.0625 in. The wire electrodes were produced via hot-rolling followed by wire-drawing.

included the addition of copper (approximately 0.2 wt. %) and boron (approximately 0.005 wt. %) to the mid-level wire. The copper addition was used to obtain precipitation strengthening and the boron addition was made to retard the transformation of austentite to high temperature ferrite. The compositions also included approximately 0.03 wt. % titanium as a deoxidizer, grain refiner and "nitrogen getter." Since HSLA-80 and HSLA-100 steels exhibit a higher nickel content than manganese content, the wire formulations used higher nickel content, and a relatively lower manganese content in order to minimize difficulties that could possibly occur due to base metal dilution effects.

The actual chemical compositions of the solid wire electrodes were also adjusted using appropriate delta quantities (see Oldland, P. T., Ramsay, C. W., Matlock, D. K. and Olsen, D. L., "Significant Features of High-Strength Steel Weld Metal Microstructures," *Welding Journal,* 68(4), pp. 158s–168s, for a description of delta quantities) to compensate for the loss of alloying elements across the arc column. In GMA welding, the delta quantities of alloy elements vary with alloy element, shielding gas type, flow rate and weld energy input.

Ingots were produced using the vacuum induction melting (VIM) practice. The VIM practice was employed to allow strict control over hydrogen, oxygen and nitrogen of the ingots. Careful selection of raw materials and vacuum processing were employed to control residual elements such as sulfur and phosphorous. The VIM ingots were subsequently hot-rolled and drawn into 0.0625 in. diameter solid wire electrodes. The wire drawing operation encountered a marginal increase in wear loss in the drawing dies, compared to conventional high strength steel wire electrodes. An 80% yield was obtained from the starting quantity to the final finish quantity. The solid wire electrodes showed acceptable cast and pitch (helix). Table II, below, shows the chemical compositions of the ingots. Table III, below, shows the metallurgical characteristics of the solid wire electrodes.

Three weldments were produced in 1 inch thick HSLA-100 steel plate using a stringer bead, multi-pass GMA welding technique and each of the experimental wire electrodes. The three weldments are designated series A, B and C. The GMA welding procedure employed a single-vee joint preparation with a 45° included angle, a ½ inch root opening with a ½ inch thick strip permanent backing bar and 0.0625 inch diameter solid wire electrodes. The weld test assemblies typically measured 1 inch×36 inches×36 inches in size.

TABLE III

Metallurgical Characteristics of Solid Wire Electrodes

| Wire # | CEN | $B_{50}$ (°C.) | $M_S$ (°C.) | O + N (ppm) |
|---|---|---|---|---|
| 1 | .29 | 489 | 444 | 75 |
| 2 | .33 | 457 | 437 | 56 |
| 3 | .32 | 440 | 422 | 62 |
| 4 | .36 | 407 | 414 | 84 |
| 5 | .31 | 467 | 435 | 82 |
| 6 | .36 | 428 | 426 | 73 |
| 7 | .34 | 417 | 414 | 70 |
| 8 | .39 | 379 | 403 | 86 |
| 9 | .34 | 437 | 425 | 58 |
| 10 | .36 | 433 | 424 | 86 |

Table IV, below, shows the GMA welding schedules used to produce the demonstration weldments. The same set of welding parameters were used to produce both the root passes and the fill passes in the A-series welds (55 kJ/in energy input). The root passes of the B- and C-series welds were produced using 35 kJ/in energy input, while 110 kJ/in energy input was used to produce the fill passes. In general, the GMA welding conditions closely simulated typical shipyard fabricating conditions. These included protective shielding of the weld metal using a principally inert shielding gas (95% Ar-5% $CO_2$) at 35 CFH flow rate, and ¾ to 1 inch stick-out. The stringer bead, multi-pass welding technique used 10°–15° torch lag angle to effectively tie-in the weld passes and to produce a desirable overlap between individual weld beads. The cooling rate at 1000° F. of each of the demonstration weldments was measured by plunging a Pt/Pt-Rh thermocouple into the trailing edge of the weld pool of a fill pass at plate mid-thickness. Consistent with acceptable cast and pitch, all of the experimental wires showed good feeding behavior and minimal weld splatter, which resulted in excellent bead characteristics.

Weld metal tensile tests and weld metal CVN impact tests (at 0° F. and −60° F.) were performed per MIL-STD-248 using appropriate test specimens. The test results, which include yield strength (YS), ultimate tensile strength (UTS), the percent elongation at failure (EL), the percent reduction of area at failure (RA), and CVN impact results, are summarized in Table V, below.

TABLE IV

GMA Welding Schedule for HSLA-100 Steel Plate

| Weld Series | Voltage (Volts) | Current (Amps) | Wire Feed Rate (ipm) | Weld Travel Rate (ipm) | Energy Input (kJ/in) | Preheat/ Interpass Temp (°F.) | Measured Weld Cooling Rate @ 1000° F. (°F/s) |
|---|---|---|---|---|---|---|---|
| A | 27 | 31 | 16 | 9 | 55 | 60/125 | 42–44 |
| B | 28 | 34 | 19 | 5 | 110 | 60/125 | 23–24 |
| C | 28 | 34 | 19 | 5 | 110 | 275/300 | 10.8–11.5 |
| Root Pass | 25 | 28 | 16 | 12 | 35 | 60/125 or 275/300 | — |

TABLE V

Mechanical Property Test Results of GMA Welds

| Weld # | Tensile Test † | | | | CVN Impact Test †† | |
|---|---|---|---|---|---|---|
| | YS (ksi) | UTS (ksi) | EL (%) | RA (%) | @ −60° F. (ft-lbs) | @ 0° F. (ft-lbs) |
| 1A | 88.6 | 102.5 | 24.0 | 72.2 | 44.8 | 107.4 |
| 1B | 87.5 | 99.2 | 24.5 | 72.5 | 73.0 | 111.6 |
| 1C | 81.8 | 96.3 | 26.5 | 71.6 | 51.5 | 90.8 |
| 2A | 108.4 | 116.2 | 21.4 | 70.4 | 60.7 | 98.6 |
| 2B | 95.1 | 108.6 | 23.5 | 69.2 | 26.2* | 72.8 |
| 2C | 88.5 | 107.4 | 24.5 | 71.0 | 25.2* | 66.2 |
| 3A | 105.7 | 114.6 | 22.0 | 68.9 | 74.6 | 102.0 |
| 3B | 92.6 | 105.1 | 23.5 | 70.9 | 73.2 | 112.0 |
| 3C | 88.3 | 102.8 | 24.3 | 70.6 | 49.0 | 95.0 |
| 4A | 118.3 | 127.6 | 20.5 | 66.7 | 48.4 | 74.0 |
| 4B | 104.4 | 118.1 | 22.0 | 66.4 | 68.6 | 90.8 |
| 4C | 102.2 | 120.7 | 21.5 | 67.4 | 47.4 | 89.2 |
| 5A | 93.8 | 103.9 | 23.0 | 70.2 | 68.4 | 108.2 |
| 5B | 85.6 | 100.4 | 25.8 | 71.0 | 51.6 | 98.8 |
| 5C | 80.2 | 98.2 | 24.8 | 70.3 | 45.7 | 100.0 |
| 6A | 113.3 | 122.4 | 21.5 | 66.8 | 52.7 | 76.4 |
| 6B | 98.5 | 113.6 | 23.0 | 68.4 | 46.3 | 90.6 |
| 6C | 95.9 | 112.0 | 24.3 | 68.6 | 38.2 | 99.6 |
| 7A | 107.2 | 116.7 | 20.5 | 67.4 | 69.2 | 89.4 |
| 7B | 96.2 | 109.6 | 23.0 | 69.3 | 88.4 | 109.4 |
| 7C | 88.3 | 108.0 | 24.8 | 69.1 | 67.8 | 107.4 |
| 8A | 121.2 | 132.8 | 20.8 | 64.9 | 54.8 | 75.4 |
| 8B | 107.3 | 125.2 | 21.5 | 65.5 | 62.4 | 95.8 |
| 8C | 108.2 | 122.2 | 23.5 | 66.4 | 54.2 | 86.4 |
| 9A | 104.5 | 113.6 | 21.8 | 66.2 | 47.4 | 77.2 |
| 9B | 97.6 | 109.6 | 23.0 | 67.3 | 50.3 | 89.8 |
| 9C | 90.6 | 106.8 | 24.8 | 68.4 | 45.8 | 84.6 |
| 10A | 113.5 | 122.2 | 21.0 | 64.8 | 10.9 | 24.0 |
| 10B | 103.5 | 116.7 | 22.0 | 67.4 | 38.6 | 76.0 |
| 10C | 98.1 | 114.1 | 23.8 | 67.6 | 32.7 | 85.4 |

† - Average of two test results;
†† - Average of five test results.
*Visual examination showed weld defects in CVN specimens.
YS Yield strength determined from 0.2% strain.

The tests showed the weld metals produced using solid wire electrodes 3, 4 and 7 to meet the mechanical property requirements of MIL-100S, and match/overmatch the yield strength of HSLA-80 steel, and undermatch the yield strength of HSLA-100 steel. Additionally, weld metals produced using the wire electrodes 4 and 8 were found to meet the mechanical property requirements of MIL-120S, and match/overmatch the yield strength of HSLA-100 steel under all three welding conditions. The CVN impact toughness at 0° F. showed higher values for the B series welds, followed by the C series and the A series (except weld 3A).

Table VI shows the chemical composition of the GMA weld metals. Analyses of the weld metal chemical composition showed an increase in the levels of carbon, chromium, copper and niobium in the weld metal with increasing energy input. Increases in energy input also resulted in a decrease in the levels of silicon and manganese in the weld metal but did not show an appreciable variation in the nickel and molybdenum contents.

Table VII shows the metallurgical characteristics of the above GMA weld metals. Excepting weld 8A, all weld metals showed a higher $B_{50}$ temperature than the corresponding $M_S$ temperature. Weld metals meeting the mechanical property requirements of MIL-100S exhibit a CEN ranging from 0.33 to 0.38, a $B_{50}$ temperature ranging from 417° C. to 461° C. and an $M_S$ temperature ranging from 410° C. to 423° C. Weld metals meeting the mechanical property requirements of MIL-120S exhibit a CEN ranging from 0.37 to 0.41, and $B_{50}$ and $M_S$ temperatures ranging from 404° C. to 437° C. and 403° C. to 415° C., respectively.

The results reveal several general trends. First, yield strength of the weld metals increased with CEN. Second, for a given $B_{50}$ temperature, welds produced using higher cooling rates showed a higher strength. Third, for a given $M_S$ temperature, welds produced using higher cooling rates showed a higher strength. Fourth, at a given CEN, the CVN impact toughness increased with increasing weld cooling rates. Fifth, a comparison of the effects of oxygen content and nitrogen content of the weld metals on the CVN impact toughness at 0° F. and −60° F. indicated the beneficial effects of minimal amounts of oxygen and nitrogen on the CVN impact toughness.

TABLE VI

Chemical Composition of GMA Weld Metals †

| Weld # | C | Mn | Si | Ni | Cr | Mo | Ti | Cu | Nb | B | V | O (ppm) | N (ppm) |
|---|---|---|---|---|---|---|---|---|---|---|---|---|---|
| 01A | 0.034 | 1.22 | 0.28 | 2.73 | 0.12 | 0.49 | 0.010 | 0.100 | 0.005 | 0.0002 | <0.005 | 210 | 16 |
| 01B | 0.040 | 1.23 | 0.27 | 2.70 | 0.11 | 0.48 | 0.010 | 0.12 | 0.005 | 0.0002 | <0.005 | 190 | 21 |
| 01C | 0.035 | 1.26 | 0.28 | 2.67 | 0.09 | 0.48 | 0.009 | 0.10 | 0.005 | 0.0002 | <0.005 | 207 | 22 |
| 02A | 0.038 | 1.28 | 0.32 | 2.57 | 0.04 | 0.97 | 0.012 | 0.093 | 0.005 | 0.0002 | <0.005 | 167 | 15 |

TABLE VI-continued

Chemical Composition of GMA Weld Metals †

| Weld # | C | Mn | Si | Ni | Cr | Mo | Ti | Cu | Nb | B | V | O (ppm) | N (ppm) |
|---|---|---|---|---|---|---|---|---|---|---|---|---|---|
| 02B | 0.042 | 1.22 | 0.28 | 2.66 | 0.07 | 1.01 | 0.009 | 0.12 | 0.005 | 0.0002 | <0.005 | 184 | 21 |
| 02C | 0.046 | 1.18 | 0.27 | 2.51 | 0.08 | 0.88 | 0.009 | 0.17 | 0.005 | 0.0002 | <0.005 | 194 | 17 |
| 03A | 0.045 | 1.31 | 0.26 | 3.77 | 0.05 | 0.49 | 0.011 | 0.13 | 0.01 | 0.0002 | <0.005 | 200 | 16 |
| 03B | 0.046 | 1.22 | 0.27 | 3.76 | 0.12 | 0.48 | 0.008 | 0.26 | 0.012 | 0.0003 | <0.005 | 204 | 14 |
| 03C | 0.051 | 1.15 | 0.26 | 3.83 | 0.13 | 0.49 | 0.008 | 0.26 | 0.012 | 0.0002 | <0.005 | 214 | 14 |
| 04A | 0.046 | 1.36 | 0.33 | 3.78 | 0.04 | 0.91 | 0.013 | 0.06 | 0.01 | 0.0003 | <0.005 | 198 | 13 |
| 04B | 0.054 | 1.14 | 0.27 | 3.69 | 0.11 | 0.86 | 0.008 | 0.28 | 0.013 | 0.0003 | <0.005 | 201 | 17 |
| 04C | 0.051 | 1.18 | 0.27 | 3.70 | 0.09 | 0.86 | 0.008 | 0.21 | 0.012 | 0.0003 | <0.005 | 190 | 36 |
| 05A | 0.032 | 1.56 | 0.27 | 2.44 | 0.04 | 0.46 | 0.01 | 0.077 | 0.005 | 0.0002 | <0.005 | 176 | 11 |
| 05B | 0.039 | 1.45 | 0.26 | 2.61 | 0.07 | 0.49 | 0.007 | 0.15 | 0.005 | 0.0002 | <0.005 | 180 | 15 |
| 05C | 0.035 | 1.46 | 0.25 | 2.54 | 0.06 | 0.48 | 0.006 | 0.12 | 0.005 | 0.0002 | <0.005 | 180 | 16 |
| 06A | 0.042 | 1.58 | 0.32 | 2.58 | 0.08 | 0.93 | 0.014 | 0.13 | 0.005 | 0.0003 | <0.005 | 167 | 18 |
| 06B | 0.044 | 1.63 | 0.30 | 2.59 | 0.07 | 0.97 | 0.01 | 0.09 | 0.005 | 0.0003 | <0.005 | 114 | 16 |
| 06C | 0.047 | 1.45 | 0.25 | 2.56 | 0.11 | 0.86 | 0.009 | 0.22 | 0.005 | 0.0003 | <0.005 | 179 | 16 |
| 07A | 0.037 | 1.66 | 0.33 | 3.93 | 0.03 | 0.49 | 0.012 | 0.06 | 0.01 | 0.0004 | <0.005 | 174 | 17 |
| 07B | 0.041 | 1.60 | 0.28 | 3.75 | 0.08 | 0.49 | 0.006 | 0.20 | 0.012 | 0.0004 | <0.005 | 183 | 7 |
| 07C | 0.045 | 1.55 | 0.29 | 3.83 | 0.07 | 0.48 | 0.007 | 0.18 | 0.011 | 0.0004 | <0.005 | 191 | 12 |
| 08A | 0.040 | 1.56 | 0.30 | 3.70 | 0.06 | 0.89 | 0.013 | 0.08 | 0.014 | 0.0003 | <0.005 | 181 | 11 |
| 08B | 0.051 | 1.40 | 0.24 | 3.81 | 0.13 | 0.84 | 0.007 | 0.26 | 0.013 | 0.0003 | <0.005 | 199 | 10 |
| 08C | 0.053 | 1.5 | 0.27 | 3.70 | 0.16 | 0.83 | 0.009 | 0.34 | 0.015 | 0.0004 | <0.005 | 206 | 15 |
| 09A | 0.036 | 1.45 | 0.28 | 3.13 | 0.07 | 0.70 | 0.010 | 0.10 | 0.005 | 0.0002 | <0.005 | 213 | 12 |
| 09B | 0.039 | 1.33 | 0.23 | 3.10 | 0.09 | 0.67 | 0.008 | 0.19 | 0.005 | 0.0002 | <0.005 | 214 | 13 |
| 09C | 0.042 | 1.29 | 0.23 | 3.12 | 0.13 | 0.68 | 0.007 | 0.18 | 0.005 | 0.0002 | <0.005 | 210 | 16 |
| 10A | 0.033 | 1.46 | 0.30 | 3.25 | 0.05 | 0.71 | 0.013 | 0.22 | 0.005 | 0.0050 | <0.005 | 192 | 11 |
| 10B | 0.043 | 1.38 | 0.24 | 3.14 | 0.11 | 0.66 | 0.007 | 0.34 | 0.005 | 0.0042 | <0.005 | 120 | 16 |
| 10C | 0.036 | 1.35 | 0.27 | 3.16 | 0.10 | 0.67 | 0.009 | 0.33 | 0.005 | 0.0041 | <0.005 | 176 | 17 |

† Chemical composition expressed in wt %; O, and N contents expressed in ppm; average of three readings. The balance is iron.

TABLE VII

Metallurgical Characteristics of GMA Weld Metals

| Weld # | CEN | $B_{50}$ (°C.) | $M_S$ (°C.) | O + N (ppm) |
|---|---|---|---|---|
| 01A | 0.28 | 501 | 446 | 226 |
| 01B | 0.29 | 501 | 444 | 211 |
| 01C | 0.28 | 502 | 446 | 229 |
| 02A | 0.33 | 466 | 436 | 182 |
| 02B | 0.34 | 462 | 433 | 205 |
| 02C | 0.33 | 480 | 438 | 211 |
| 03A | 0.33 | 456 | 421 | 216 |
| 03B | 0.33 | 460 | 423 | 218 |
| 03C | 0.34 | 461 | 421 | 228 |
| 04A | 0.38 | 417 | 410 | 211 |
| 04B | 0.38 | 437 | 415 | 218 |
| 04C | 0.37 | 435 | 415 | 226 |
| 05A | 0.29 | 490 | 443 | 187 |
| 05B | 0.30 | 487 | 439 | 195 |
| 05C | 0.29 | 491 | 442 | 196 |
| 06A | 0.36 | 438 | 424 | 185 |
| 06B | 0.37 | 430 | 421 | 130 |
| 06C | 0.36 | 453 | 427 | 195 |
| 07A | 0.35 | 422 | 411 | 191 |
| 07B | 0.35 | 430 | 413 | 190 |
| 07C | 0.35 | 432 | 412 | 203 |
| 08A | 0.38 | 404 | 408 | 192 |
| 08B | 0.40 | 410 | 406 | 209 |
| 08C | 0.41 | 404 | 403 | 221 |
| 09A | 0.33 | 451 | 427 | 225 |
| 09B | 0.33 | 463 | 430 | 227 |
| 09C | 0.34 | 462 | 429 | 226 |
| 10A | 0.35 | 447 | 426 | 203 |
| 10B | 0.35 | 456 | 426 | 136 |
| 10C | 0.34 | 459 | 430 | 193 |

The metallurgical characteristics of the GMA weld metals and the corresponding all-weld metal mechanical property test values confirm the validity and utility of the metallurgical criteria for designing solid wire electrodes. The criteria relates the strength and toughness requirements of wire electrodes with chemical composition. The criteria also relates the need for preheat/interpass/post soak temperature controls with the chemical composition. Solid wire electrodes and welding conditions that provided weld metals characterized by: (1) a CEN ranging from 0.33 to 0.41; (2) a $B_{50}$ temperature ranging from 404° C. to 461° C.; (3) an $M_S$ temperature less than the $B_{50}$ temperature; and (4) minimal oxygen and nitrogen content, exhibited superior weld mechanical properties, including excellent low temperature toughness when welding HSLA steels over a range of weld energy input and preheat, and interpass temperature controls.

Although the invention has been described in considerable detail with reference to certain preferred versions thereof, other versions are possible and the invention is not limited to the preferred versions, but may be variously embodied within the scope of the following claims.

What is claimed is:

1. A bare, solid, consumable, ferrous welding electrode for gas metal arc welding of HSLA-80 and HSLA-100 steels consisting essentially of iron, carbon, manganese, nickel, molybdenum, silicon, copper, and boron, wherein the amounts, in weight percent, of carbon (C), manganese (Mn), nickel (Ni), molybdenum (Mo), silicon (Si), copper (Cu), and boron (B) satisfy the following equations:

$$B_{50}(°C.) = 770 - (270 \times C) - (90 \times Mn) - (37 \times Ni) - (70 \times Cr) - (83 \times Mo)$$

where the calculated $B_{50}$ is about 400° C. to 500° C.;

$$M_S(°C.) = 561 - (474 \times C) - (33 \times Mn) - (17 \times Ni) - (17 \times (Cr) - (21 \times Mo)$$

where the calculated $M_S$ is about 400° C. to 450° C.;

$$CEN = C + A(C) \times [Si/24 + Mn/6 + Cu/15 + Ni/20 + (Cr+Mo+V+Nb)/5 + 5B]$$

where $A(C) = 0.75 + 0.25 \tanh [20 \times (C-0.12)]$; and where the calculated CEN is about 0.28 to 0.41.

2. The welding electrode of claim 1, having a calculated $M_S$ temperature less than the $B_{50}$ temperature.

3. The welding electrode of claim 1, further comprising up to 50 ppm nitrogen and up to 300 ppm oxygen.

4. The welding electrode of claim 1, further comprising up to 50 ppm nitrogen and up to 300 ppm oxygen, and having a calculated $M_S$ temperature less than the calculated $B_{50}$ temperature.

5. A consumable welding electrode for gas metal arc welding of HSLA-80 and HSLA-100 steels consisting essentially of iron, carbon, manganese, nickel, molybdenum, silicon, copper, boron, nitrogen, oxygen and hydrogen, wherein the amount of nitrogen is less than 50 ppm, the amount of oxygen is less than 300 ppm, the amount of hydrogen is less than 5.0 mL/100 g, and the amounts, in weight percent, of carbon (C), manganese (Mn), nickel (Ni), molybdenum (Mo), silicon (Si), copper (Cu), and boron (B) satisfy the following equations:

$$B_{50}(°C.) = 770 - (270 \times C) - (90 \times Mn) - (37 \times Ni) - (70 \times Cr) - (83 \times Mo)$$

where the calculated $B_{50}$ is about 400° C. to 500° C.;

$$M_S(°C.) = 561 - (474 \times C) - (33 \times Mn) - (17 \times Ni) - (17 \times Cr) - (21 \times Mo)$$

where the calculated $M_S$ is about 400° C. to 450° C.;

$$CEN = C + A(C) \times [Si/24 + Mn/6 + Cu/15 + Ni/20 + (Cr+Mo+V+Nb)/5 + 5B]$$

where $A(C) = 0.75 + 0.25 \tanh [20 \times (C-0.12)]$; and where the calculated CEN is about 0.28 to 0.41; and wherein the balance is iron (Fe) and incidental impurities.

6. The welding electrode of claim 5, having a calculated $M_S$ temperature less than the calculated $B_{50}$ temperature.

7. A consumable ferrous welding electrode for gas metal arc welding of HSLA-80 and HSLA-100 steels, said electrode consisting essentially of the following elements, in weight percent:

carbon up to 0.06,
manganese 1.0 to 2.0,
silicon 0.20 to 0.50,
nickel 2.0 to 4.0,
molybdenum 0.30 to 1.0,
titanium up to 0.05,
copper up to 0.5,
boron up to 0.01,
sulfur up to 0.01,
phosphorous up to 0.01, and
the balance iron.

8. The consumable ferrous welding electrode of claim 7, wherein the amounts, in weight percent, of carbon (C), manganese (Mn), nickel (Ni), molybdenum (Mo), silicon (Si), copper (Cu), and boron (B) satisfy the following equations:

$$B_{50}(°C.) = 770 - (270 \times C) - (90 \times Mn) - (37 \times Ni) - (70 \times Cr) - (83 \times Mo)$$

where the calculated $B_{50}$ is about 400° C. to 500° C.;

$$M_S(°C.) = 561 - (474 \times C) - (33 \times Mn) - (17 \times Ni) - (17 \times Cr) - (21 \times Mo)$$

where the calculated $M_S$ is about 400° C. to 450° C.;

$$CEN = C + A(C) \times [Si/24 + Mn/6 + Cu/15 + Ni/20 + (Cr+Mo+V+Nb)/5 + 5B]$$

where $A(C) = 0.75 + 0.25 \tanh [20 \times (C-0.12)]$; and where the calculated CEN is about 0.28 to 0.41.

9. The consumable ferritic welding electrode of claim 7, having a calculated $M_S$ temperature less than the calculated $B_{50}$ temperature.

10. A consumable welding electrode consisting essentially of:

up to 0.06 percent by weight carbon,
1.0 to 2.0 percent by weight manganese,
0.20 to 0.50 percent by weight silicon,
2.0 to 4.0 percent by weight nickel,
0.30 to 1.0 percent by weight molybdenum,
up to 0.05 percent by weight titanium,
up to 0.5 percent by weight copper,
up to 0.01 percent by weight boron,
up to 0.01 percent by weight sulfur,
up to 0.01 percent by weight phosphorous,
up to 50 ppm nitrogen,
up to 300 ppm oxygen,
up to 5.0 mL/100 g hydrogen, and
the balance iron.

11. A consumable welding electrode consisting essentially of:

up to 0.06 percent by weight carbon,
1.0 to 2.0 percent by weight manganese,
0.20 to 0.50 percent by weight silicon,
2.0 to 4.0 percent by weight nickel,
0.30 to 1.0 percent by weight molybdenum,
up to 0.05 percent by weight titanium,
up to 0.5 percent by weight copper,
up to 0.01 percent by weight boron,
up to 0.01 percent by weight sulfur,
up to 0.01 percent by weight phosphorous,
up to 50 ppm nitrogen,
up to 300 ppm oxygen,
up to 5.0 mL/100 g hydrogen, and
the balance iron,
wherein the amounts, in weight percent, of carbon (C), manganese (Mn), nickel (Ni), molybdenum (Mo), silicon (Si), copper (Cu), and boron (B) satisfy the following equations:

$$B_{50}(°C.) = 770 - (270 \times C) - (90 \times Mn) - (37 \times Ni) - (70 \times Cr) - (83 \times Mo)$$

where the calculated $B_{50}$ is about 400° C. to 500° C.;

$$M_S(°C.) = 561 - (474 \times C) - (33 \times Mn) - (17 \times Ni) - (17 \times Cr) - (21 \times Mo)$$

where the calculated $M_S$ is about 400° C. to 450° C.;

$$CEN=C+A(C)\times[Si/24+Mn/6+Cu/15+Ni/20+(Cr+Mo+V+Nb)/5+5B]$$

where $A(C)=0.75+0.25$ tanh $[20\times(C-0.12)]$; and where the calculated CEN is about 0.28 to 0.41.

12. The consumable welding electrode of claim 11, wherein the $M_S$ temperature is less than the calculated $B_{50}$ temperature.

13. A method of gas metal arc welding HSLA-80 or HSLA-100 steel, said method comprising arc welding said steels with a bare, solid, consumable, ferrous electrode, said electrode consisting essentially of iron, carbon, manganese, nickel, molybdenum, silicon, copper, and boron, wherein the amounts, in weight percent, of carbon (C), manganese (Mn), nickel (Ni), molybdenum (Mo), silicon (Si), copper (Cu), and boron (B) satisfy the following equations:

$$B_{50}(°C.)=770-(270\times C)-(90\times Mn)-(37\times Ni)-(70\times Cr)-(83\times Mo)$$

where the calculated $B_{50}$ is about 400° C. to 500° C.;

$$M_s(°C.)=561-(474\times C)-(33\times Mn)-(17\times Ni)-(17\times Cr)-(21\times Mo)$$

where the calculated $M_S$ is about 400° C. to 450° C.;

$$CEN=C+A(C)\times[Si/24+Mn/6+Cu/15+Ni/20+(Cr+Mo+V+Nb)/5+5B]$$

where $A(C)=0.75+0.25$ tanh $[20\times((C-0.12)]$;

where the calculated CEN is about 0.28 to 0.41; and wherein the balance being iron and incidental impurities.

14. A method of gas metal arc welding HSLA-80 or HSLA 100 steel, said method comprising arc welding said steels with a bare, solid, consumable, ferrous electrode, said electrode consisting essentially of:

up to 0.06 by percent weight carbon, 1.0 to 2.0 by percent weight manganese, 0.20 to 0.50 by percent weight silicon, 0.30 to 1.0 by percent weight molybdenum, up to 0.05 by percent weight titanium, up to 0.5 by percent weight copper, up to 0.01 by percent weight boron, up to 0.01 by percent weight sulfur, up to 0.01 by percent weight phosphorous, and the balance being iron.

15. An arc deposited ferrous weld metal consisting essentially of iron, carbon, manganese, nickel, molybdenum, silicon, copper, and boron, wherein the amounts, in weight percent, of carbon (C), manganese (Mn), nickel (Ni), molybdenum (Mo), silicon (Si), copper (Cu), and boron (B) satisfy the following equations:

$$B_{50}(°C.)=770-(270\times C)-(90\times Mn)-(37\times (Ni)-(70\times Cr)-(83\times Mo)$$

where the calculated $B_{50}$ is about 400° C. to 500° C.;

$$M_s(°C.)=561-(474\times C)-(33\times Mn)-(17\times Ni)-(17\times Cr)-(21\times Mo)$$

where the calculated $M_S$ is about 400° C. to 450° C.;

$$CEN=C+A(C)\times[Si/24+Mn/6+Cu/15+Ni/20+(Cr+Mo+V+Nb)/5+5B]$$

where $A(C)=0.75+0.25$ tanh $[20\times(C-0.12)]$;

where the calculated CEN is about 0.28 to 0.41; and the balance being iron.

16. The arc deposited ferrous weld metal of claim 15, further comprising up to 50 ppm nitrogen and up to 300 ppm oxygen, and having a calculated $M_S$ temperature less than the calculated $B_{50}$ temperature.

17. An arc deposited ferrous weld metal from gas metal arc welding of HSLA-80 and HSLA-100 steels, said weld metal consisting essentially of:

up to 0.06 percent by weight carbon, 1.0 to 2.0 percent by weight manganese, 0.20 to 0.50 percent by weight silicon, 2.0 to 4.0 percent by weight nickel, 0.30 to 1.0 percent by weight molybdenum, up to 0.05 percent by weight titanium, up to 0.5 percent by weight copper, up to 0.01 percent by weight boron, up to 0.01 percent by weight sulfur, up to 0.01 percent by weight phosphorous, up to 50 ppm nitrogen, up to 300 ppm oxygen, and the balance being iron.

18. An arc deposited ferrous weld metal consisting essentially of up to 0.06 percent by weight carbon, 1.0 to 2.0 percent by weight manganese, 0.20 to 0.50 percent by weight silicon, 2.0 to 4.0 percent by weight nickel, 0.30 to 1.0 percent by weight molybdenum, up to 0.05 percent by weight titanium, up to 0.5 percent by weight copper, up to 0.01 percent by weight boron, up to 0.01 percent by weight sulfur, up to 0.01 percent by weight phosphorous, up to 50 ppm nitrogen, up to 300 ppm oxygen, and the balance being iron and incidental impurities.

19. A process of gas metal arc welding HSLA-80 or HSLA-100 steel, said steel comprising, in percent by weight, up to 0.07 carbon, 0.4 to 0.70 or 0.75 to 1.05 manganese, up to 0.40 silicon, 0.70 to 1.00 or 1.5 to 2.00 or 3.35 to 3.65 nickel, 0.15 to 0.25 or 0.30 to 0.55 or 0.55 to 0.65 molybdenum, up to 0.02 titanium, 1.0 to 1.30 or 1.45 to 1.75 copper, 0.02 to 0.06 columbium (niobium), up to 0.03 vanadium, up to 0.006 sulphur, and up to 0.020 phosphorous; said process comprising:

establishing an electric arc between said steel and the consumable electrode of claim 1;

transferring electrode material from said consumable electrode to said steel; and advancing said consumable electrode to maintain said arc.

20. A ferrous welding electrode for gas metal arc welding HSLA-80 or HSLA-100 steels, said electrode consisting essentially of:

0.026 to 0.030 percent by weight carbon, 1.49 to 1.82 percent by weight manganese, 0.33 to 0.37 percent by weight silicon, 2.38 to 3.78 percent by weight nickel, 0.51 to 0.99 percent by weight molybdenum,
0.025 to 0.033 percent by weight titanium,
0.001 to 0.20 percent by weight copper,
0.001 to 0.0057 percent by weight boron,
0.001 to 0.003 percent by weight vanadium,
0.0018 to 0.0023 percent by weight sulfur,
0.001 percent by weight phosphorous,
4 to 10 ppm nitrogen,
47 to 82 ppm oxygen, and
the balance being iron.

21. An arc deposited ferrous weld metal from gas metal arc welding HSLA-80 or HSLA-100 steels, said weld metal consisting essentially of:

0.032 to 0.054 percent by weight carbon,
1.14 to 1.66 percent by weight manganese,
0.23 to 0.33 percent by weight silicon,
2.44 to 3.93 percent by weight nickel,
0.46 to 1.01 percent by weight molybdenum,
0.006 to 0.013 percent by weight titanium,
0.06 to 0.34 percent by weight copper,
0.002 to 0.005 percent by weight boron,
0.001 to 0.003 percent by weight vanadium,
up to 0.01 percent by weight sulfur,
up to 0.01 percent by weight phosphorous,
7 to 22 ppm nitrogen,
114 to 214 ppm oxygen, and
the balance being iron.

22. A consumable welding electrode for gas metal arc welding HSLA-80 or HSLA-100 steels, said electrode consisting essentially of:

0.026 to 0.030 percent by weight carbon,
1.49 to 1.82 percent by weight manganese,
0.33 to 0.37 percent by weight silicon,
2.38 to 3.78 percent by weight nickel,
0.51 to 0.99 percent by weight molybdenum,
0.025 to 0.033 percent by weight titanium,
0.001 percent by weight copper,
0.001 to 0.0057 percent by weight boron,
0.001 to 0.003 percent by weight vanadium,
0.0018 to 0.0023 percent by weight sulfur,
0.001 percent by weight phosphorous,
4 to 10 ppm nitrogen,
47 to 82 ppm oxygen, and
the balance being iron.

23. A welding electrode for gas metal arc welding HSLA-80 or HSLA-100 steels, said welding electrode comprising on a weight percent of said welding electrode less than 0.06 percent carbon and 0.0 to 0.02 percent chromium and further comprising manganese, nickel, and molybdenum in proportions effective to produce a weld deposit with a low carbon bainitic ferrite microstructure.

* * * * *